(12) United States Patent
Terashima et al.

(10) Patent No.: US 9,897,221 B2
(45) Date of Patent: Feb. 20, 2018

(54) VALVE HAVING AN IMPROVED SEALING ELEMENT AND AN IMPROVED VALVE SEAT SUPPORT

(71) Applicant: Robert Bosch GmbH, Stuttgart (DE)

(72) Inventors: Hirokazu Terashima, Ludwigsburg (DE); Andreas Peetz, Ludwigsburg (DE); Frank Miller, Ilsfeld (DE); Elmar Okrent, Remseck (DE); Matthias Proksch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/178,200

(22) Filed: Feb. 11, 2014

(65) Prior Publication Data

US 2014/0231693 A1   Aug. 21, 2014

(30) Foreign Application Priority Data

Feb. 19, 2013   (DE) .................. 10 2013 202 610

(51) Int. Cl.
*F16K 1/36*       (2006.01)
*F16K 1/42*       (2006.01)
(Continued)

(52) U.S. Cl.
CPC ......... *F16K 25/00* (2013.01); *F02M 21/0266* (2013.01); *F16K 1/36* (2013.01);
(Continued)

(58) Field of Classification Search
CPC ........ F16K 25/00; F16K 25/005; F16K 25/02; F16K 25/04; F16K 1/44; F16K 1/42; F02M 21/0266
(Continued)

(56) References Cited

U.S. PATENT DOCUMENTS 8,186,377 B2 *   5/2012   Ishitoya et al. .......... 137/516.29
2013/0032745 A1 *   2/2013   Stein et al. .................... 251/333
2013/0032747 A1 *   2/2013   Stein et al. .................... 251/359

FOREIGN PATENT DOCUMENTS

DE    102006006883 A1 *   8/2007   ............... F16K 1/44
DE    102007002841 A1 *   7/2008   ............... F16K 1/36
(Continued)

OTHER PUBLICATIONS

NPL #1—English translation of DE 102006006883 A1 as translated by EPO's Espacenet.*
(Continued)

*Primary Examiner* — John K Fristoe, Jr.
*Assistant Examiner* — Josephine Trinidad-Borges
(74) *Attorney, Agent, or Firm* — Norton Rose Fulbright US LLP; Gerard Messina

(57) ABSTRACT

A sealing element of a valve, e.g., a gas valve, for controlling a medium includes a base body having a sealing surface, the sealing surface either (i) being inclined in relation to a center axis of the sealing element or (ii) having at least one inclined area. In addition, a valve seat support of the valve for controlling a medium includes: a first ring-shaped valve seat in a first valve seat plane; a second ring-shaped valve seat in a second valve seat plane; and a passage aperture situated between the first valve seat and the second valve seat, the first and second valve seat planes being perpendicular to a center axis of the valve seat support.

6 Claims, 5 Drawing Sheets

(51) Int. Cl.
*F16K 25/00* (2006.01)
*F02M 21/02* (2006.01)
*F16K 31/06* (2006.01)

(52) U.S. Cl.
CPC ............ *F16K 1/42* (2013.01); *F16K 31/0651* (2013.01); *Y02T 10/32* (2013.01)

(58) Field of Classification Search
USPC ................................................. 251/333, 359
See application file for complete search history.

(56) References Cited

FOREIGN PATENT DOCUMENTS

| DE | 102007006934 A1 * | 8/2008 | ............... F16K 1/36 |
|---|---|---|---|
| DE | 102008001844 A1 * | 11/2009 | ........... F16K 25/005 |
| DE | 10 2010 043 641 | 5/2012 | |
| DE | 102013202599 A1 * | 8/2014 | ............... F16K 1/36 |

OTHER PUBLICATIONS

NPL #2—English Abstract of DE 102007006934 A1 as translated by EPO's Espacenet.*
NPL #3—English Abstract of DE 102013202599 A1 as translated by EPO's Espacenet.*
NPL #1—English Translation as provided by EPO's Espacenet of DE 102008001844 A1.*
NPL #2—English Translation as provided by EPO's Espacenet of DE 102007002841 A1.*

* cited by examiner

VALVE HAVING AN IMPROVED SEALING ELEMENT AND AN IMPROVED VALVE SEAT SUPPORT

BACKGROUND OF THE INVENTION

1. Field of the Invention

The present invention relates to a sealing element of a valve and a valve seat support of a valve, e.g., a gas valve, and such a valve for controlling a gaseous medium.

2. Description of the Related Art

Valves for controlling media are known in various embodiments from the related art. In the automotive field, gaseous fuels, for example, natural gas or biogas are also increasingly being used in liquid fuel. In particular, the valves previously used for liquid fuels frequently do not correspond to the requirements of gas valves for gaseous fuels, however. For example, a valve which is designed in particular for gaseous hydrogen is known from Published German patent application document DE 10 2010 043 641 A1. A set of problems which is not yet completely solved in the case of gas valves relates in particular to a reliable opening of the valve in the event of cold outside temperatures or cold engine temperatures. More reliable operation of the valve must be made possible in this case in particular in a temperature range from −40° C. to 120° C. In particular at low temperatures, however, undesirable leaks may occur on the valve, since the sealing elements, which are typically manufactured from an elastomeric material, only have very low elastic properties at low temperatures. In particular at low temperatures, it has been found that problems may occur during opening in the area of the valve seat, whereby the opening times may become undefined.

It would therefore be desirable, with simple and cost-effective construction, to have improvements during the opening procedure at low temperatures.

BRIEF SUMMARY OF THE INVENTION

This is achieved according to the present invention in that a sealing element of a valve, e.g., a gas valve, is provided, which also ensures rapid and uncomplicated opening of the valve at low temperatures. Furthermore, the sealing element according to the present invention has a high level of valve leak-tightness when the valve is closed. In addition, a low tendency to wear of the sealing element may be achieved. This is achieved according to the present invention in that the sealing element has a disk-shaped base body having a sealing surface, which is inclined in relation to a center axis of the sealing element or has an inclined area. The sealing surface of the sealing element is therefore not situated perpendicularly to the center axis of the sealing element, as in the related art, but rather at an angle thereto. In other words, the sealing surface and a plane perpendicular to the center axis of the sealing element are not coincident. The sealing surface is particularly preferably situated in a plane which is at an acute angle in relation to the plane perpendicular to the center axis. The angle is preferably between 1° and 10°.

To be able to be manufactured as cost-effectively and simply as possible, the base body tapers, particularly preferably tapers conically.

Furthermore, the base body preferably has a first sealing area and a second sealing area, which is spaced apart from the first sealing area. The two sealing areas are particularly preferably situated coaxially to one another on the base body. In this embodiment of the present invention, a different contact pressure may particularly be achieved by the inclined sealing surface on the two sealing areas, so that opening of the valve is possible without problems in particular also at temperatures below the freezing point. In particular, in this way different contact surfaces of the individual sealing areas on the valve seat are achieved. The first and/or second sealing area is/are preferably provided as a sealing circular line or as a sealing ring surface.

Furthermore, a rear surface on the base body of the sealing element is preferably situated perpendicularly to the center axis of the sealing element. In this way, the sealing element on the rear surface of the base body may be connected securely and rapidly to a closing element or the like.

Furthermore, a thickness of the closing element in the direction of the center axis is preferably different on the first sealing area from a thickness on the second sealing area. Due to the different thicknesses of the sealing element on the two sealing areas, deformations of different sizes of the sealing element result during operation in the case of equal closing force at both sealing areas. Different opening forces result therefrom at the two sealing areas, whereby in sum a reduced opening force for opening the sealing element results.

The sealing surface on the base body is particularly preferably inclined in the closing direction in relation to the center axis or alternatively is inclined in the opening direction in relation to the center axis.

Furthermore, the present invention relates to a valve seat support of a valve, in particular a gas valve, for controlling a medium. The valve seat support according to the present invention includes a first ring-shaped valve seat in a first valve seat plane and a second ring-shaped valve seat in a second valve seat plane. Furthermore, the valve seat support according to the present invention includes a passage aperture, which is situated between the first and second valve seats. The first and second valve seat planes are parallel to one another and perpendicular to a center axis of the valve seat support. Therefore, according to the present invention, a valve seat support having two valve seats may be provided, which are situated on different planes. This geometry according to the present invention on the valve seat support also allows easier opening of a valve at low temperatures.

The valve seat support is particularly preferably designed having a first valve seat and a second valve seat, which are each designed as an annular bead. The two annular bead-like valve seats are particularly preferably situated coaxially to one another.

Furthermore, a depression is preferably provided in the valve seat support at least on one of the ring-shaped valve seats. Depressions are particularly preferably provided on each of the two valve seats. The depressions are preferably situated directly adjacent to the first and/or second valve seat. The provision of the depressions prevents a sealing element from coming into contact in the closed state of a valve with a surface of the valve seat support oriented toward the sealing element and an opening force for opening the valve is thus increased.

Furthermore, a distance between the first valve seat plane and the second valve seat plane is preferably ≥10 μm, preferably ≥15 μm, and in particular ≥20 μm. Furthermore, the distance between the two valve seat planes is preferably ≤50 μm.

Furthermore, the present invention relates to a valve seat support having a ring-shaped valve seat, which has subareas of different heights in the circumferential direction of the valve seat. Therefore, according to the present invention, a ring-shaped valve seat is provided, which has different height levels on a single valve seat in relation to a plane perpendicular to a center axis of the valve seat support. The ring-shaped valve seat is particularly preferably formed as wavy, having a uniform wavelength. In this way, areas result along the circumference of the valve seat, at which a sealing element is compressed more strongly and less strongly in the closed state, so that different opening forces along the circumference of the valve seat result therefrom. The height differences in the circumferential direction of the valve seat are particularly preferably ≤50 µm, preferably ≤20 µm, more preferably ≤15 µm, and particularly preferably ≥10 µm. A sealing line along the ring-shaped valve seat preferably has at least two upper and two lower inflection points.

Furthermore, the present invention relates to a valve, in particular a gas valve, including a sealing element according to the present invention and/or including a valve seat support according to the present invention.

The present invention particularly preferably relates to a natural gas valve for injecting gaseous fuel into a combustion chamber of an internal combustion engine, in particular in a vehicle.

Preferred exemplary embodiments of the present invention are described in detail hereafter with reference to the appended drawings. Identical or functionally identical parts are identified with the same reference numerals in the exemplary embodiments.

DETAILED DESCRIPTION OF THE INVENTION

Figure 1:
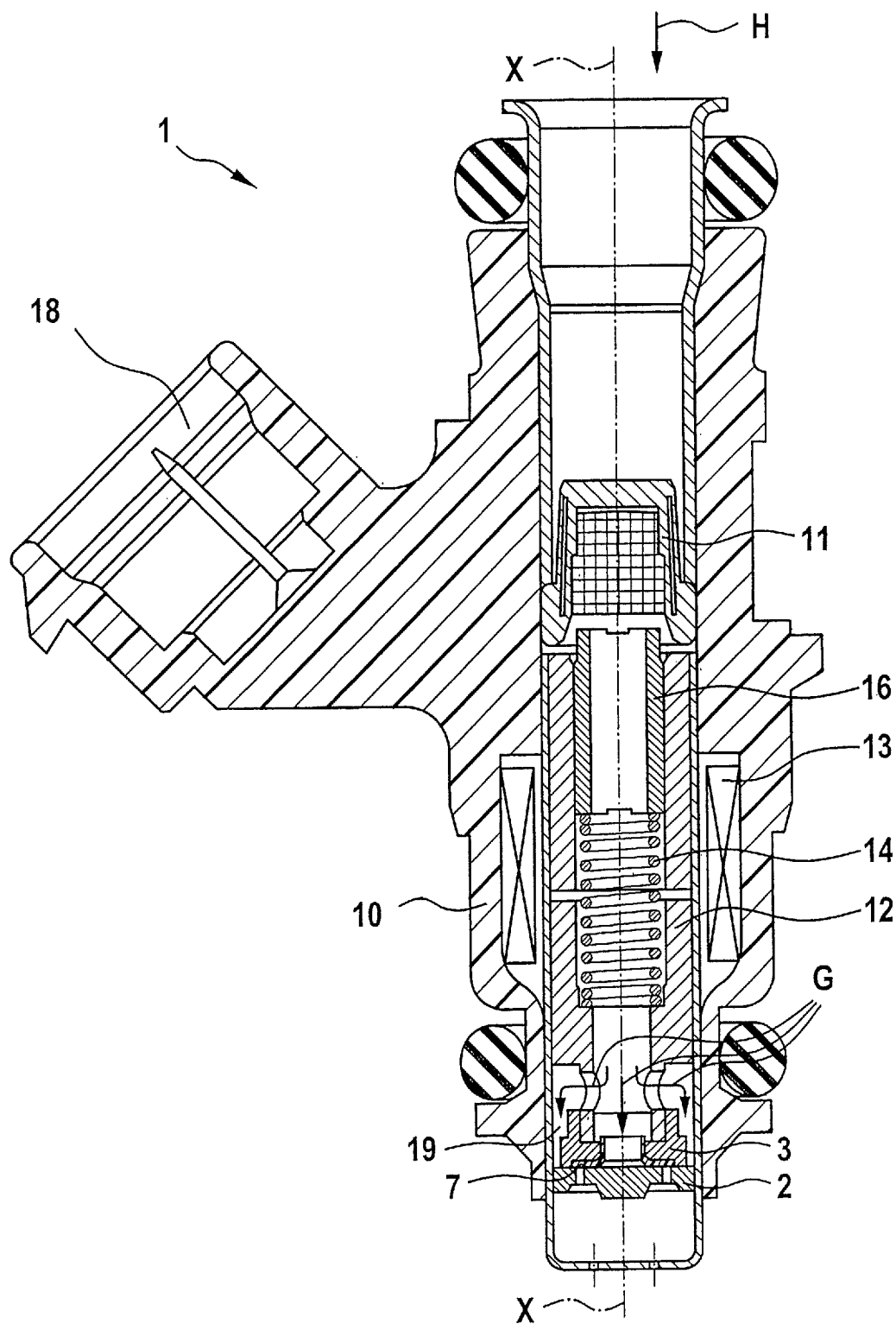
FIG. 1 shows a schematic sectional view of a gas valve according to one first exemplary embodiment of the present invention.
Figure 2:
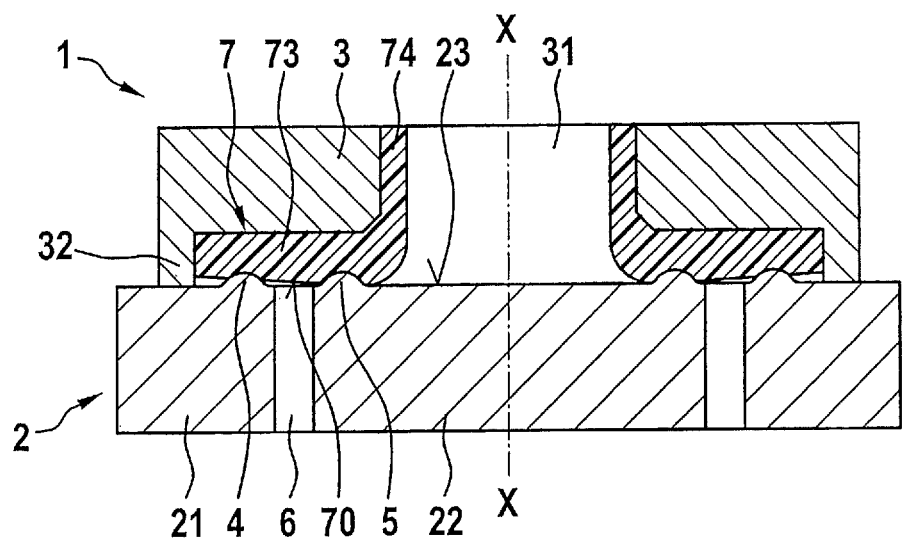
FIG. 2 shows a schematic sectional view of a valve having a sealing element according to one first exemplary embodiment of the present invention in the closed state.
Figure 3:
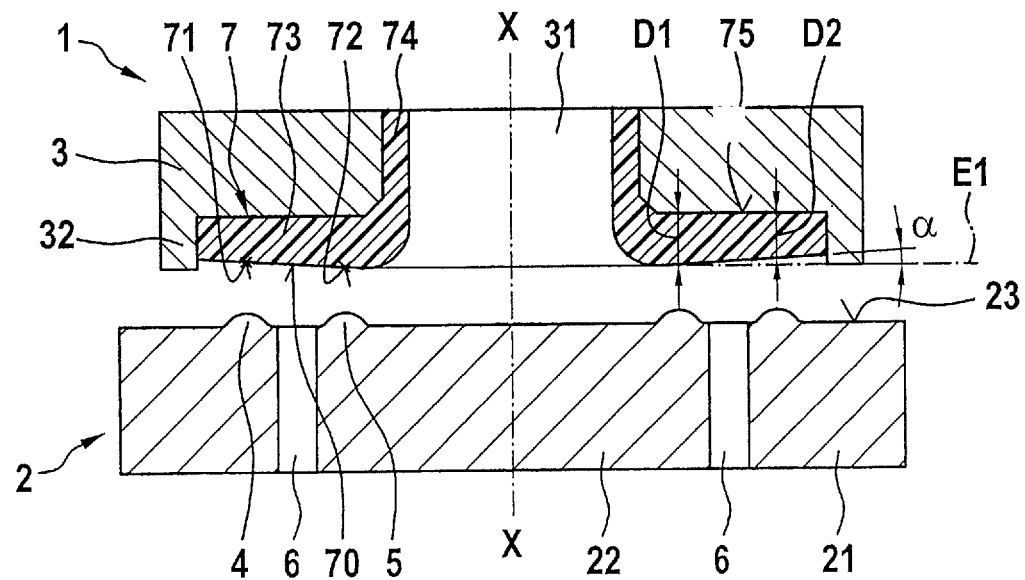
FIG. 3 shows a schematic sectional view of the valve from FIG. 2 in the opened state.

A gas valve 1 according to one first exemplary embodiment of the present invention is described in detail hereafter with reference to FIGS. 1 through 3.

Gas valve 1 of the first exemplary embodiment is an injection valve for injecting fuel into a combustion chamber. Gas valve 1 includes a valve housing 10, an armature 12, a solenoid 13, and a closing spring 14. A setting bolt 16 is provided to set a restoring force of closing spring 14. The gas is supplied in the axial direction (arrow H) and conducted through a filter 11. Solenoid 13 is fixed on valve housing 10 with the aid of a plastic injection mold. An electrical plug connection 18 is provided laterally on gas valve 1.

A closing element 3, on which a sealing element 7 is situated, is fastened on armature 12 at one axial end. Closing element 3 closes passage apertures 6, which are formed in a valve seat support 2. FIG. 1 shows the closed state of gas valve 1. Arrows G indicate a flow direction of the gaseous fuel when the gas valve is open, the gas being injected through a chamber 19 in valve housing 10 and through passage apertures 6 into a combustion chamber. Furthermore, a central aperture 31 (cf. FIG. 2) is provided in closing element 3, via which gas may also flow to passage apertures 6.

FIGS. 2 and 3 show a gas valve 1 having a sealing element 7 according to the first exemplary embodiment of the present invention in detail. FIG. 2 shows the closed state of the valve, and FIG. 3 shows the opened state of the valve.

Gas valve 1 includes a disk-shaped valve seat support 2, which has multiple passage apertures 6. Passage apertures 6 are situated in a ring shape and multiple webs (not shown) connect an outer area 21 to an inner area 22 of valve seat support 2. A first bead-like valve seat 4 is provided along the outer circumference of passage apertures 6, and a second bead-like valve seat 5 is provided along the inner circumference of passage apertures 6. The shape of the two valve seats 4, 5 is formed identically in section. The two valve seats 4, 5 are also spaced apart equally proceeding from a base plane 23 of valve seat support 2.

Furthermore, gas valve 1 includes closing element 3, on which sealing element 7 is situated. Sealing element 7 includes a base body 73 and an inner flange area 74, which protrudes into central aperture 31 in closing element 3. Sealing element 7 may be fastened simply and securely on closing element 3 by inner flange area 74 on base body 73.

A sealing surface 70 of sealing element 7 is inclined in relation to a center axis X-X of gas valve 1, which also forms a center axis of the sealing element. A first sealing area 71 and a second sealing area 72 (cf. FIG. 3) are provided on sealing surface 70. The two sealing areas 71, 72 rest on first and second valve seats 4, 5 in the closed state of the valve (cf. FIG. 2).

Furthermore, a stop 32 on closing element 3 may be provided in a simple way on the radial outer end area of sealing element 7.

As is apparent from FIG. 3, a thickness D1 of sealing element 7 on first sealing area 71 is greater in this case than a thickness D2 of second sealing area 72. A rear side 75 of the sealing element is situated perpendicularly to center axis X-X. Since sealing surface 70 is inclined in relation to center axis X-X, base body 73 of the sealing element therefore tapers outward in the radial direction.

In this case, sealing element 7 has a taper in such a way that a thickness of the sealing element on the radial outermost area of base body 73 is less by 10 µm than a thickness on the thickest area of base body 73.

Due to this different geometric design of sealing areas 71, 72, gas valve 1 has different closing forces on the first and second sealing areas in the closed state. Different contact surfaces on first and second sealing areas 71, 72 also result in conjunction with first and second valve seats 4, 5. In this way, in particular at low temperatures, in which sealing element 7, which is manufactured from an elastomeric material, is less elastic than at higher temperatures, more rapid and easier opening of the valve is made possible. In this exemplary embodiment, the opening procedure begins at first valve seat 4, the pressurized medium additionally assisting the opening procedure itself shortly after the beginning of the opening procedure.

Therefore, lesser opening forces are required overall for the opening procedure of gas valve 1, in particular at temperatures below 0° C., since the opening procedure takes place by a type of peeling off of sealing element 7 initially from first valve seat 4 and then from second valve seat 5. In addition, a lesser tendency to wear is also achieved by sealing element 7 according to the present invention, which significantly lengthens the service life of sealing element 7. The improved opening characteristic, in particular at low temperatures, is achieved according to the present invention without a geometrically complicated sealing element 7 having to be provided. No difference from the previously used sealing elements results in this case, in particular with regard to the manufacturing costs of sealing element 7. The concept according to the present invention of situating sealing surface 70 at an angle to center axis X-X, which is not equal to a right angle, solves the opening problem of elastomeric seals in gas valves at low temperatures below 0° C. in a surprisingly simple way. The sealing surface is preferably situated at an angle of 1° to 10° in relation to a plane perpendicular to center axis X-X.

Figure 4:
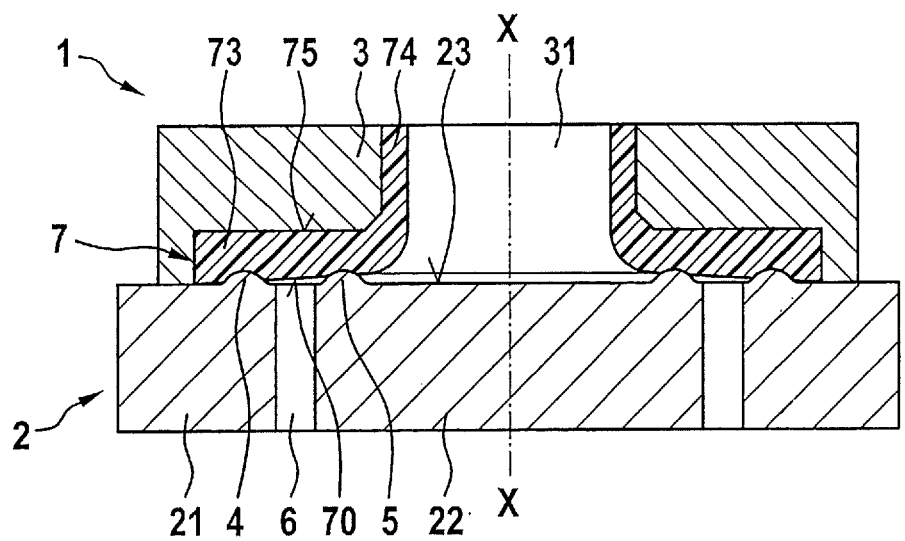
FIG. 4 shows a schematic sectional view of a valve having a sealing element according to a second exemplary embodiment of the present invention in a closed state.
Figure 5:
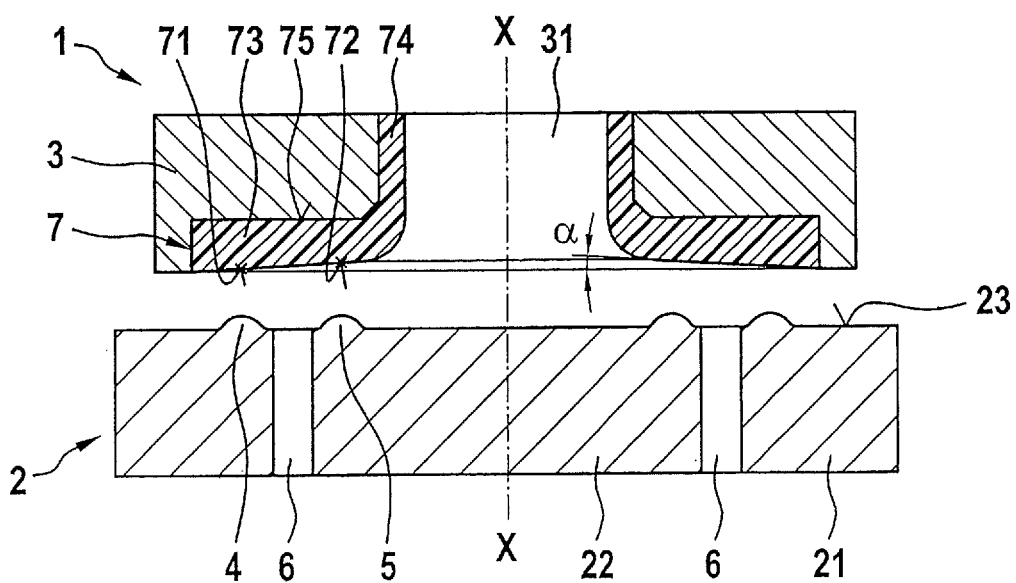
FIG. 5 shows a schematic sectional view of the valve from FIG. 4 in an opened state.

FIGS. 4 and 5 show a gas valve having a sealing element 7 according to a second exemplary embodiment, which essentially corresponds to the first exemplary embodiment. In contrast to the first exemplary embodiment, however, in sealing element 7 of the second exemplary embodiment, sealing surface 70 is inclined inward. In this way, the opening procedure begins at second valve seat 5, the gaseous medium being able to be supplied to assist the opening procedure via passage aperture 31 in closing element 3. Angle of inclination α of sealing surface 70 in relation to a plane perpendicular to the center axis X-X is preferably in the range from 1° to 10°.

Figure 6:
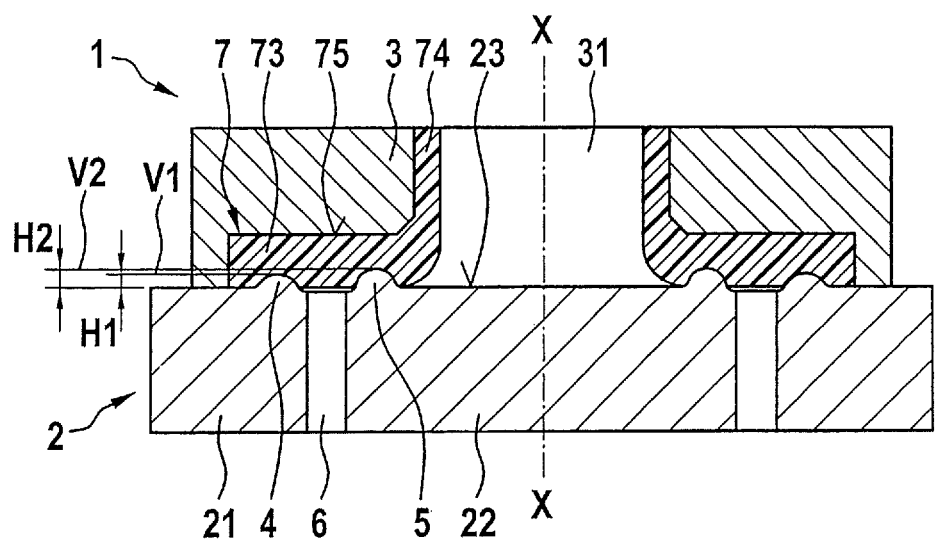
FIG. 6 shows a schematic sectional view of a valve according to a third exemplary embodiment of the present invention in the closed state.

FIG. 6 shows a gas valve having a valve seat support 2 according to a third exemplary embodiment of the present invention. In contrast to the preceding exemplary embodiments, in valve seat support 2 of the third exemplary embodiment, a height of valve seats 4, 5 is different. In this case, first valve seat 4 has a height H1 in the direction of center axis X-X perpendicular to a base plane 23 on valve seat support 2. Second valve seat 5 has a height H2 proceeding from base plane 23. Height H2 is clearly greater than height H1. Height H2 is preferably at least 10 μm taller than height H1. Due to this geometric measure H1<H2, valve seats 4, 5 of valve seat support 2 lie in a first and a second valve seat plane V1, V2, which are perpendicular to center axis X-X. Different pressure forces and different contact surfaces of sealing element 7 on the two valve seats 4, 5 are thus also achieved in the closed state. Base body 73 of sealing element 7 may be formed having a constant thickness in the radial direction, or alternatively, as in the first exemplary embodiment, designed to taper outward in the opening direction of closing element 3, or alternatively, as in the second exemplary embodiment, designed to taper inward in the opening direction of closing element 3.

Figure 7:
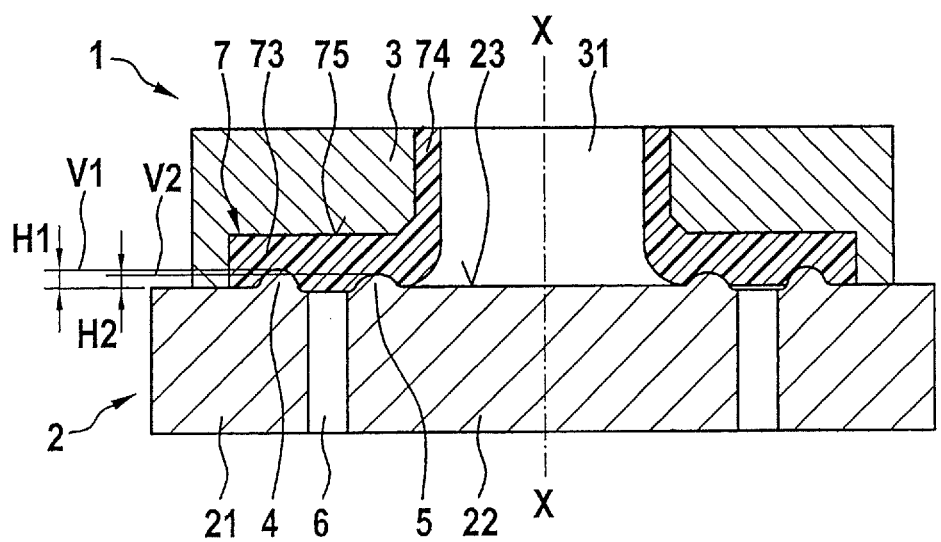
FIG. 7 shows a schematic sectional view of a valve according to a fourth exemplary embodiment of the present invention in the closed state.

FIG. 7 shows a gas valve having a valve seat support 2 according to a fourth exemplary embodiment of the present invention. In contrast to the third exemplary embodiment, in valve seat support 2 of the fourth exemplary embodiment, first valve seat 4 is taller than second valve seat 5, proceeding from base plane 23 of valve seat support 2 (H1>H2). Base body 73 of sealing element 7 may again be designed having a constant thickness or tapering inward or tapering outward or having an inclined sealing surface 70 with constant thickness.

Figure 8:
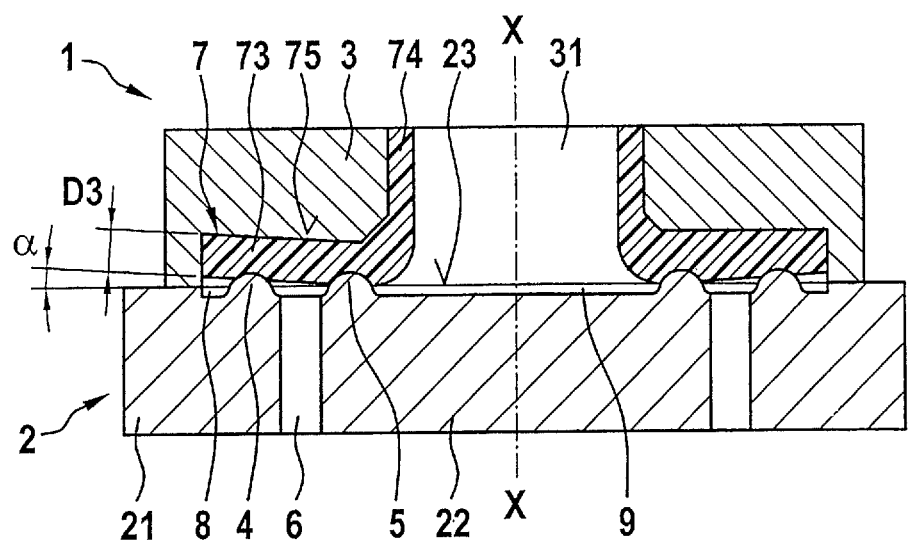
FIG. 8 shows a schematic sectional view of a valve according to a fifth exemplary embodiment of the present invention in the closed state.

FIG. 8 shows a gas valve according to a fifth exemplary embodiment of the present invention, in which first valve seat 4 and second valve seat 5 are situated at the same height proceeding from a base plane 23 of valve seat support 2. Sealing element 7 has a base body 73, which has a constant thickness D3. Furthermore, a first recess 8 is formed radially outside first valve seat 4 and a second recess 9 is formed radially inside second valve seat 5 in valve seat support 2. Recesses 8, 9 prevent sealing element 7 from coming into direct contact with a surface of valve seat support 2 in the closed state. It may thus be ensured that opening forces for opening closing element 3 do not become excessively high due to a large contact surface of sealing element 7.

Figure 9:
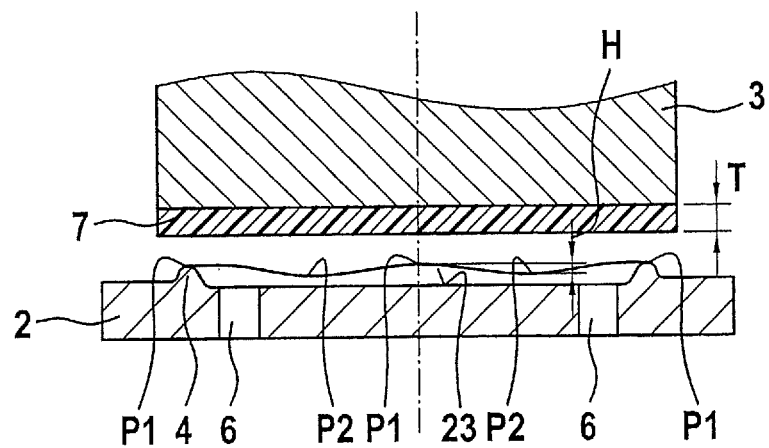
FIG. 9 shows a schematic sectional view of a valve according to a fifth exemplary embodiment of the present invention in the opened state.

FIG. 9 shows a gas valve 1 according to a sixth exemplary embodiment of the present invention. In this exemplary embodiment, precisely one first valve seat 4 is provided on valve seat support 2. As is apparent from FIG. 9, ring-shaped valve seat 4 has subareas of different heights in the circumferential direction. A height difference H between a highest point P1 (maximum) in the direction of center axis X-X and a lowest point P2 (minimum) in the direction of center axis X-X is at least 10 μm. Single valve seat 4 has four maxima P1 and four minima P2 in the circumferential direction in this case, the overall geometric shape of valve seat 4 being wavelike. Sealing element 7 is a sealing disk having a constant thickness T in this exemplary embodiment. Thickness T of sealing element 7 is selected in such a way that the sealing element also presses against minima P2 in the closed state. Height H is shown exaggerated in FIG. 8 for clarification, height H being 10 μm in this exemplary embodiment.

Furthermore, it is also to be noted in regard to the sixth exemplary embodiment that the wavy valve seat may also be used, of course, in gas valves which have a first and a second valve seat 4, 5, as shown in the exemplary embodiments 1 through 5. The wavy valve seat may also be combined with all described sealing elements 7, which have an inclined sealing surface 70 in relation to a plane perpendicular to center axis X-X, as described in the preceding exemplary embodiments.

Furthermore, it is to be noted that all valve seats 4, 5 of the described exemplary embodiments may be combined arbitrarily with all sealing elements 7 of the described exemplary embodiments. The combinations are to be selected in such a way that if two valve seats 4, 5 are present, different sealing forces are provided in each case on the two valve seats in the closed state.

If the valve seat has a wavelike shape, sealing elements 7 are to be selected in such a way that different closing forces are provided along the circumference of the valve seat in the closed state, so that during the opening procedure, a peeling-off procedure of sealing element 7 from the wavelike valve seat assists the opening procedure.

According to the present invention, in a gas valve, at least one of the sealing partners, sealing element 7 and/or valve seat support 2, has a sealing area in at least two planes which are parallel to one another on one or more sealing seats, the planes being perpendicular to a center axis X-X of the sealing partners.

What is claimed is:

1. A gas valve for controlling a medium, comprising:
   an armature;
   a solenoid enabling the armature to be actuated;
   a closing element, which is fastened on the armature at one axial end;

a sealing element, which is situated on the closing element; and a valve seat support, wherein the closing element closes a passage aperture, which is formed in the valve seat support;

wherein the valve seat support includes:

a first ring-shaped valve seat in a first valve seat plane and having a first valve seat height, wherein the first valve seat height is measured proceeding from a base plane on the valve seat support in the direction of a center axis of the valve seat support; and a second ring-shaped valve seat in a second valve seat plane and having a second valve seat height, wherein the second valve seat height is measured proceeding from the base plane on the valve seat support in the direction of the center axis of the valve seat support;

wherein the sealing element rests on the first valve seat and on the second valve seat in a closed state of the valve, wherein the passage aperture is situated between the first valve seat and the second valve seat, wherein the first and second valve seat planes are perpendicular to the center axis of the valve seat support, wherein the second valve seat height is greater than the first valve seat height, and wherein a circumference of the first valve seat is greater than a circumference of the second valve seat, and wherein the passage aperture is situated in an annular area between the first valve seat and the second valve seat, so that it is only surrounded by the first valve seat.

2. The gas valve as recited in claim 1, wherein the first and second valve seats are each configured as an annular bead.

3. The gas valve as recited in claim 2, wherein at least one depression is provided adjacent to at least one of the first valve seat and the second valve seat.

4. The gas valve as recited in claim 2, wherein a distance between the first valve seat plane and the second valve seat plane is ≥10 μm and ≤50 μm.

5. The gas valve as recited in claim 1, wherein the sealing element has a disk-shaped base body having a sealing surface inclined in relation to a center axis of the sealing element, and wherein the sealing surface is situated in a plane which is at an acute angle in relation to the plane perpendicular to the center axis.

6. The gas valve as recited in claim 5, wherein the angle is between about 1° and 10°.

\* \* \* \* \*